(12) United States Patent
Mahajan et al.

(10) Patent No.: US 8,504,694 B2
(45) Date of Patent: Aug. 6, 2013

(54) REMOTE CONTENT CLASSIFICATION AND TRANSMISSION USING MULTIPLE TRANSPORT CHANNELS

(75) Inventors: Rajneesh Mahajan, Bellevue, WA (US); Graham Edward Fagg, Monroe, WA (US); Nadim Y. Abdo, Bellevue, WA (US); Guatam Swaminathan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 248 days.

(21) Appl. No.: 12/719,599

(22) Filed: Mar. 8, 2010

(65) Prior Publication Data

US 2011/0219122 A1    Sep. 8, 2011

(51) Int. Cl.
*G06F 15/173* (2006.01)
(52) U.S. Cl.
USPC .......................... 709/227; 709/231; 709/217
(58) Field of Classification Search
None
See application file for complete search history.

(56) References Cited

U.S. PATENT DOCUMENTS

| 7,206,291 B2 | 4/2007 | Soldani et al. | |
| 7,552,213 B2* | 6/2009 | De Oliveira et al. | 709/224 |
| 7,616,960 B2 | 11/2009 | Anke et al. | |
| 2004/0210671 A1* | 10/2004 | Beadle et al. | 709/239 |
| 2005/0021806 A1* | 1/2005 | Richardson et al. | 709/231 |
| 2005/0262251 A1* | 11/2005 | Klemets et al. | 709/230 |
| 2005/0267972 A1* | 12/2005 | Costa-Requena et al. | 709/227 |
| 2006/0069797 A1* | 3/2006 | Abdo et al. | 709/231 |
| 2006/0190719 A1* | 8/2006 | Rao et al. | 713/160 |
| 2007/0288550 A1* | 12/2007 | Ise et al. | 709/203 |
| 2009/0183085 A1* | 7/2009 | Pasetto et al. | 715/744 |
| 2009/0185530 A1 | 7/2009 | Sternberg et al. | |
| 2009/0248885 A1 | 10/2009 | Patwardhan et al. | |
| 2009/0303913 A1 | 12/2009 | Yu et al. | |

OTHER PUBLICATIONS

Lubonski, M., "A Conceptual Architecture for Adaptation in Remote Desktop Systems Driven by the User Perception of Multimedia," 2002, 6 pages, downloaded at http://www-staff.it.uts.edu.au/~simmonds/Papers/APCC05_Marcin.pdf.
"MSRDP (Microsoft Remote Desktop Protocol)," Nov. 2, 2005, 9 pages, downloaded at http://www.protocolbase.net/protocols/protocol_MSRDP.php#DESCRIPTION.
"Remote Desktop Services (Terminal Services) Team Blog," Apr. 9, 2007, 3 pages, downloaded at http://blogs.msdn.com/rds/archive/2007/04/09/bandwidth-allocation-for-terminal-server-connections-over-rdp.aspx.
"Toward Content-based Classification," Feb. 2001, 17 pages, downloaded at http://www.pmc-sierra.com/cgi-bin/document.pl?docnum=2002233.

\* cited by examiner

*Primary Examiner* — Ario Etienne
*Assistant Examiner* — Clayton R Williams
(74) *Attorney, Agent, or Firm* — Merchant & Gould, P.C.

(57) ABSTRACT

In various embodiments, methods and systems are disclosed for the implementation of multiple transport channels between the client and server. Each of the channels may be adapted to efficiently communicate data for a particular data type and thus be particularly well suited for its data-element characteristics and the detected link characteristics between the client and server.

19 Claims, 13 Drawing Sheets

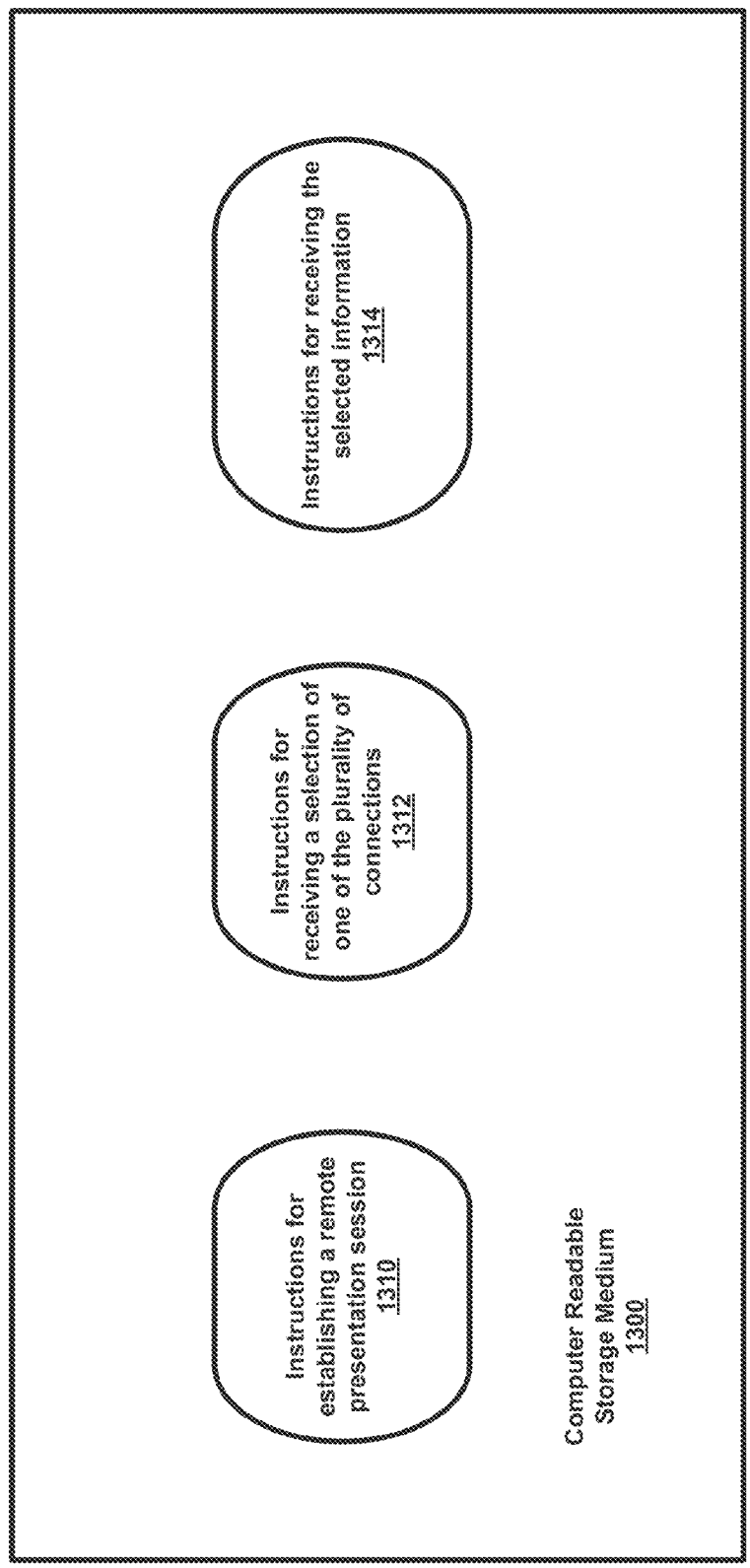

REMOTE CONTENT CLASSIFICATION AND TRANSMISSION USING MULTIPLE TRANSPORT CHANNELS

BACKGROUND

Remote computing systems can enable users to remotely access hosted resources. Servers on the remote computing systems can execute programs and transmit signals indicative of a user interface to clients that can connect by sending signals over a network conforming to a communication protocol such as the TCP/IP protocol. Each connecting client may be provided a remote presentation session, i.e., an execution environment that includes a set of resources. Each client can transmit signals indicative of user input to the server and the server can apply the user input to the appropriate session. The clients may use remote presentation protocols such as the Remote Desktop Protocol (RDP) to connect to a server resource.

During a remote presentation session, a single transport channel is typically used for sending all of the data elements. This single channel, in-turn, is typically optimized for only one class or type of data delivery. As a result some of the delivery constraints for a particular data element may not be met if the data element is not of the class or type for which the channel is optimized, thus resulting in negative user experience.

SUMMARY

In various embodiments, methods and systems are disclosed for the implementation of multiple transport channels between the client and server. Each of the channels may be adapted to efficiently communicate data for a particular data type and thus be particularly well suited for its data-element characteristics and the detected link characteristics between the client and server.

In one embodiment, the remote display and experience data may be separated into sets of elements with similar transport delivery requirements and independent transport channels may be used for their delivery. In some embodiments, data-element characteristics and measured transport characteristics may be used to select the type of channel and to further optimize the channel to meet delivery requirements.

In another embodiment, resources may be allocated among the multiple channels based on requirements for each of the channels. Furthermore, each channel's characteristics may be continuously adjusted based on changing network conditions and data-element requirements. In some embodiments, a capability to determine reliable link characteristics in the presence of multiple channels between client and server may be provided.

BRIEF DESCRIPTION OF THE DRAWINGS

The systems, methods, and computer readable media for altering a view perspective within a virtual environment in accordance with this specification are further described with reference to the accompanying drawings in which:

FIG. 13 illustrates a computer readable medium bearing computer executable instructions discussed with respect to FIGS. 1-12.

DETAILED DESCRIPTION

Computing Environments In General Terms

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

Figure 1:
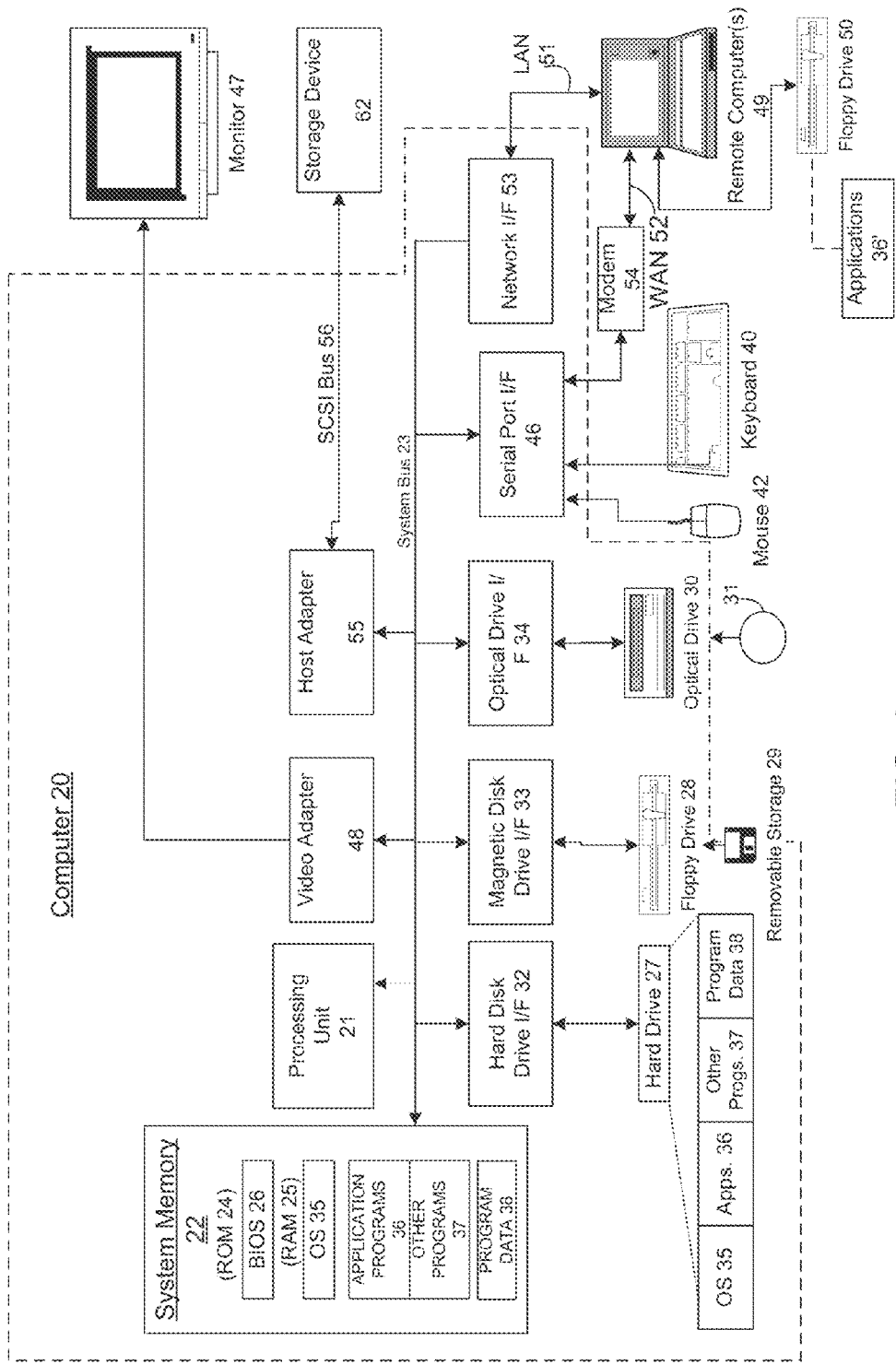
FIGS. 1 and 2 depict an example computer system wherein aspects of the present disclosure can be implemented.
Figure 2:
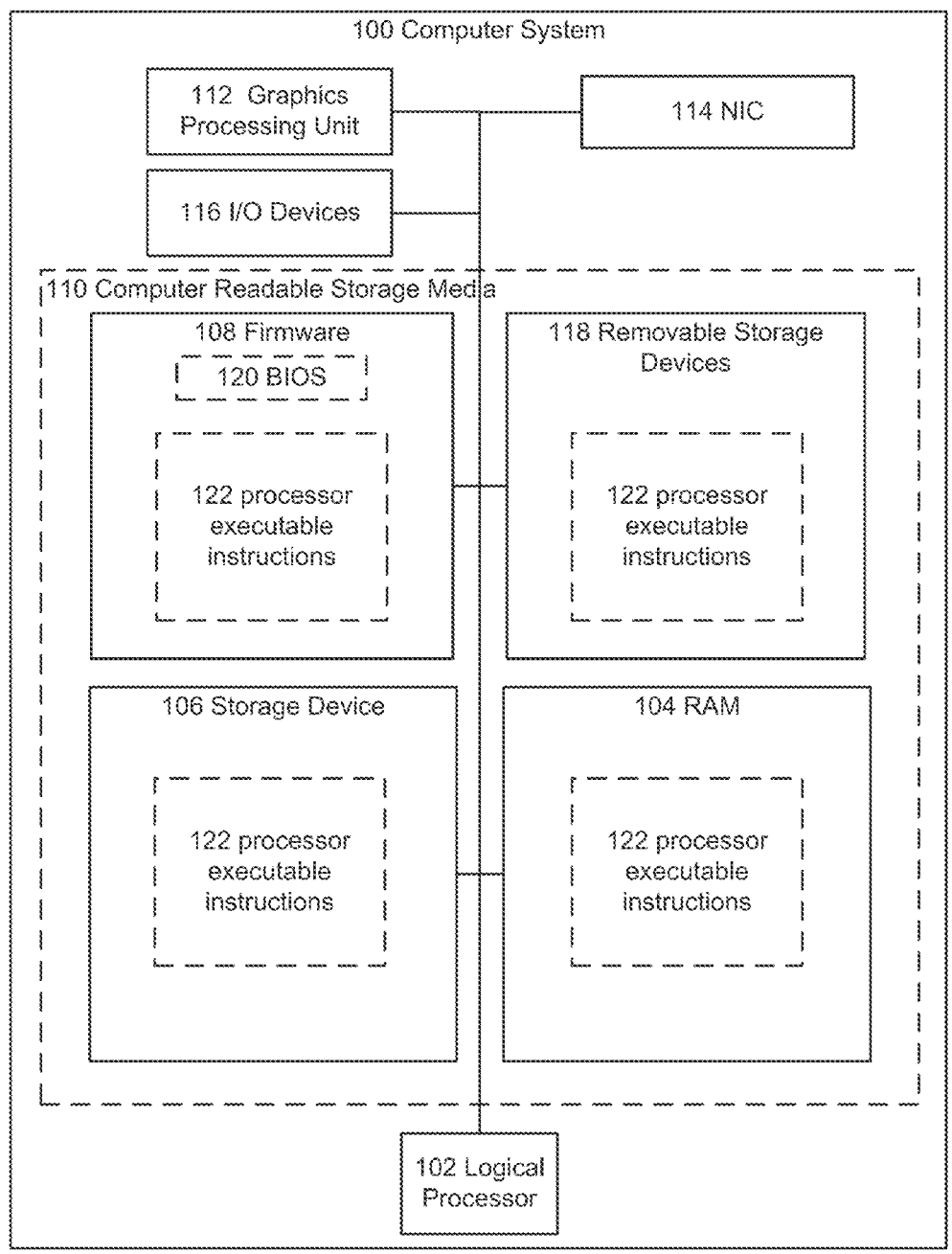

Embodiments may execute on one or more computers. FIGS. 1 and 2 and the following discussion are intended to provide a brief general description of a suitable computing environment in which the disclosure may be implemented. One skilled in the art can appreciate that computer systems 200, 300 can have some or all of the components described with respect to computer 100 of FIGS. 1 and 2.

The term circuitry used throughout the disclosure can include hardware components such as hardware interrupt controllers, hard drives, network adaptors, graphics processors, hardware based video/audio codecs, and the firmware/software used to operate such hardware. The term circuitry can also include microprocessors configured to perform function(s) by firmware or by switches set in a certain way or one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be executed by a logical processor. Since one skilled in the art can appreciate that the state of the art has evolved to a point where there is little difference between hardware, software, or a combination of hardware/software, the selection of hardware versus software to effectuate functions is merely a design choice. Thus, since one of skill in the art can appreciate that a software process can be transformed into an equivalent hardware structure, and a hardware structure can itself be transformed into an equivalent software process, the selection of a hardware implementation versus a software implementation is trivial and left to an implementer.

FIG. 1 depicts an example of a computing system which is configured to with aspects of the disclosure. The computing system can include a computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments, computer executable instructions embodying aspects of the disclosure may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, a virtual machine, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are examples and other means of establishing a communications link between the computers may be used. Moreover, while it is envisioned that numerous embodiments of the disclosure are particularly well-suited for computer systems, nothing in this document is intended to limit the disclosure to such embodiments.

Referring now to FIG. 2, another embodiment of an exemplary computing system 100 is depicted. Computer system 100 can include a logical processor 102, e.g., an execution core. While one logical processor 102 is illustrated, in other embodiments computer system 100 may have multiple logical processors, e.g., multiple execution cores per processor substrate and/or multiple processor substrates that could each have multiple execution cores. As shown by the figure, various computer readable storage media 110 can be interconnected by one or more system busses which couples various system components to the logical processor 102. The system buses may be any of several types of bus structures including a memory bus or memory controller, a peripheral bus, and a local bus using any of a variety of bus architectures. In example embodiments the computer readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer readable storage media can be used such as magnetic cassettes, flash memory cards, digital video disks, and Bernoulli cartridges.

The computer readable storage media provide non-volatile storage of processor executable instructions 122, data structures, program modules and other data for the computer 100. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by logical processor 102 including an operating system and/or application programs.

Commands and information may be received by computer 100 through input devices 116 which can include, but are not limited to, a keyboard and pointing device. Other input devices may include a microphone, joystick, game pad, scanner or the like. These and other input devices are often connected to the logical processor 102 through a serial port interface that is coupled to the system bus, but may be connected by other interfaces, such as a parallel port, game port or universal serial bus (USB). A display or other type of display device can also be connected to the system bus via an interface, such as a video adapter which can be part of, or connected to, a graphics processor 112. In addition to the display, computers typically include other peripheral output devices (not shown), such as speakers and printers. The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through a network interface card 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

A remote desktop system is a computer system that maintains applications that can be remotely executed by client computer systems. Input is entered at a client computer system and transferred over a network (e.g., using protocols based on the International Telecommunications Union (ITU) T.120 family of protocols such as Remote Desktop Protocol (RDP)) to an application on a remote desktop server. The application processes the input as if the input were entered at the remote desktop server. The application generates output in response to the received input and the output is transferred over the network to the client computer system. The client computer system presents the output data. Thus, input is received and output presented at the client computer system, while processing actually occurs at the remote desktop server. A session can include a shell and a user interface such as a desktop, the subsystems that track mouse movement within the desktop, the subsystems that translate a mouse click on an icon into commands that effectuate an instance of a program, etc. In another example embodiment the session can include an application. In this example while an application is rendered, a desktop environment may still be generated and hidden from the user. It should be understood that the foregoing discussion is exemplary and that the presently disclosed subject matter may be implemented in various client/server environments and not limited to a particular remote desktop services product.

In most, if not all remote desktop environments, input data (entered at a client computer system) typically includes mouse and keyboard data representing commands to an application and output data (generated by an application at the remote desktop server) typically includes video data for display on a video output device. Many remote desktop environments also include functionality that extend to transfer other types of data such as audio, printing commands, clipboard, and the like.

Communications channels can be used to extend the RDP protocol by allowing plug-ins to transfer data over an RDP connection. Many such extensions exist. Features such as printer redirection, clipboard redirection, port redirection, etc., use communications channel technology. Thus, in addition to input and output data, there may be many communications channels that need to transfer data. Accordingly, there may be occasional requests to transfer output data and one or more channel requests to transfer other data contending for available network bandwidth.

Figure 3:
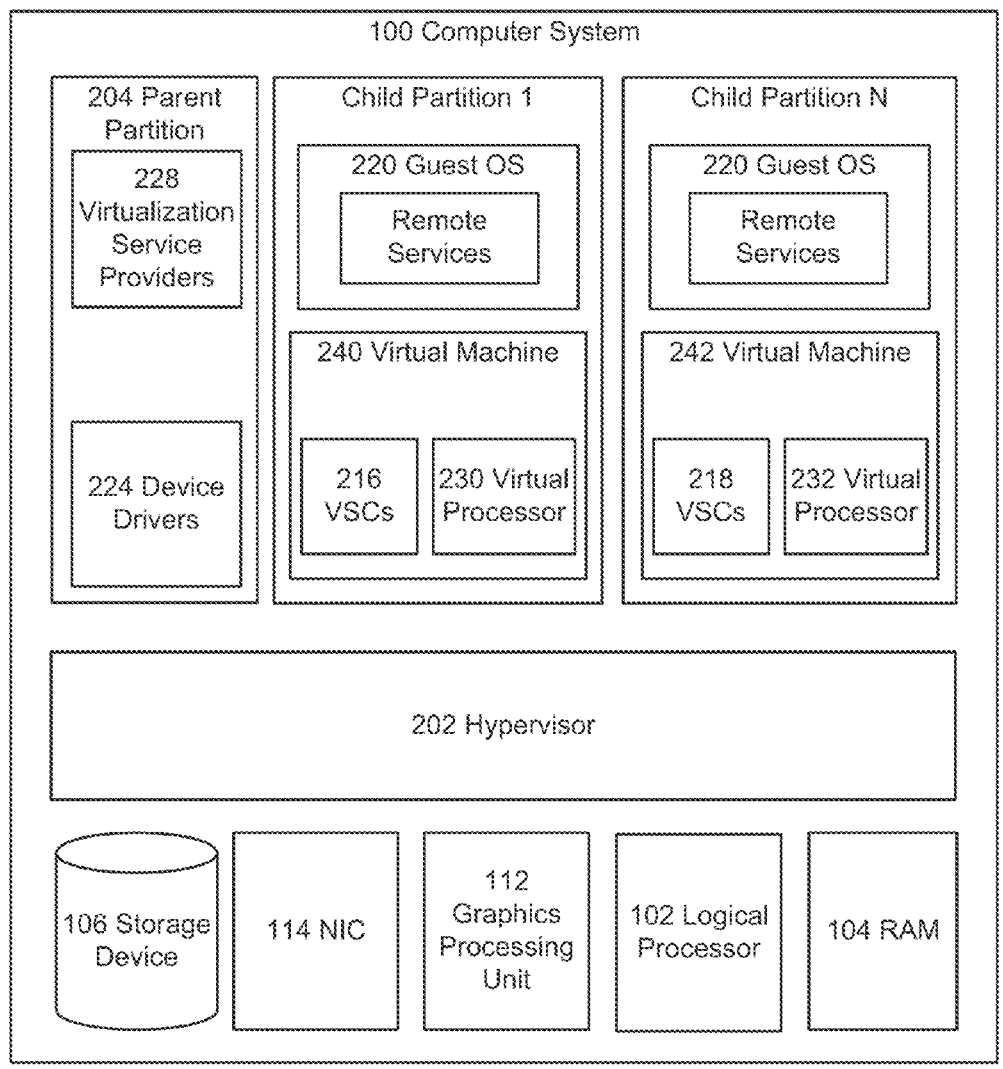
FIG. 3 depicts an operational environment for practicing aspects of the present disclosure.
Figure 4:
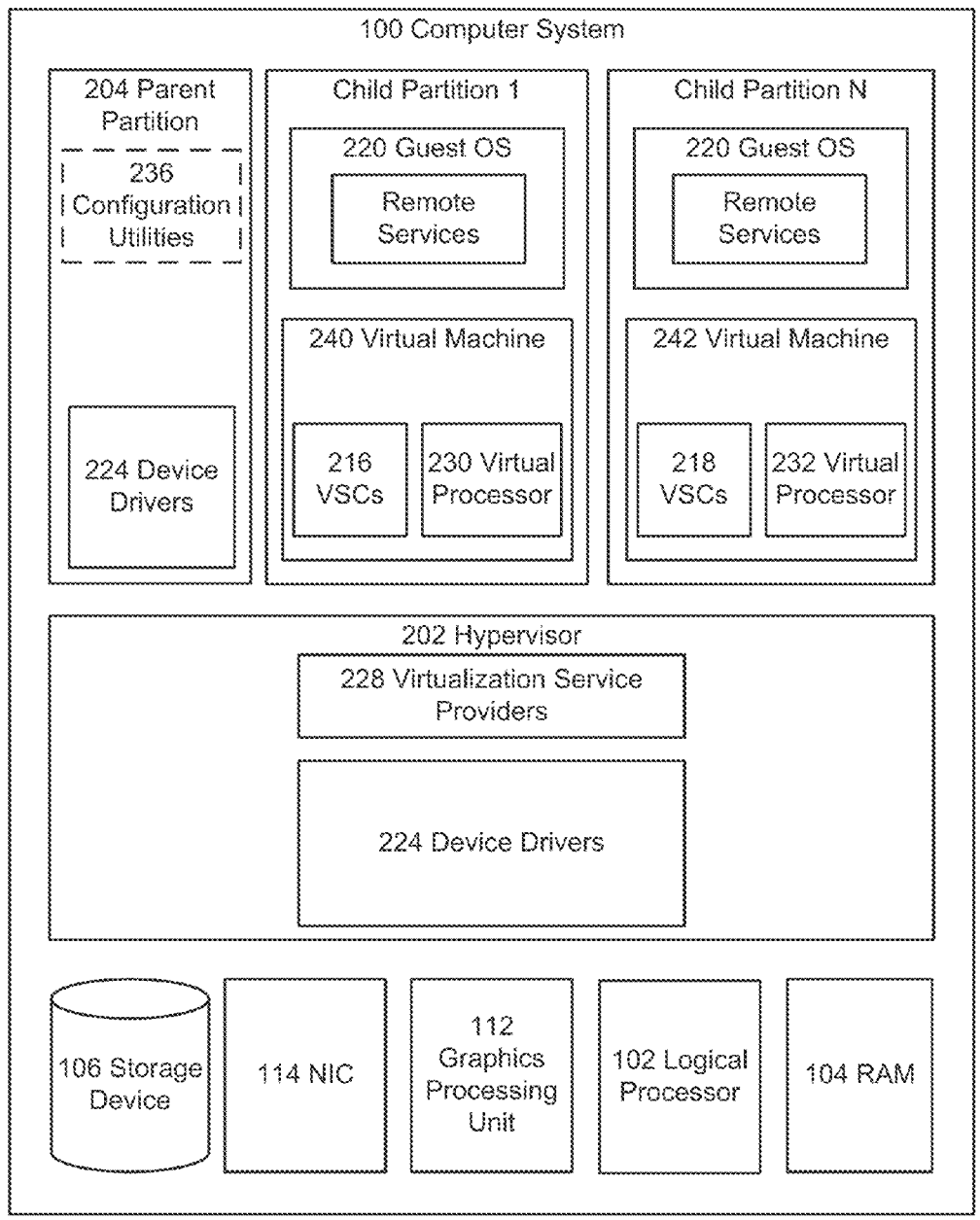
FIG. 4 depicts an operational environment for practicing aspects of the present disclosure.

Referring now to FIGS. 3 and 4, depicted are high level block diagrams of computer systems configured to effectuate virtual machines. As shown in the figures, computer system 100 can include elements described in FIGS. 1 and 2 and components operable to effectuate virtual machines. One such component is a hypervisor 202 that may also be referred to in the art as a virtual machine monitor. The hypervisor 202 in the depicted embodiment can be configured to control and arbitrate access to the hardware of computer system 100. Broadly stated, the hypervisor 202 can generate execution environments called partitions such as child partition 1 through child partition N (where N is an integer greater than or equal to 1). In embodiments a child partition can be considered the basic unit of isolation supported by the hypervisor 202, that is, each child partition can be mapped to a set of hardware resources, e.g., memory, devices, logical processor cycles, etc., that is under control of the hypervisor 202 and/or the parent partition and hypervisor 202 can isolate one partition from accessing another partition's resources. In embodiments the hypervisor 202 can be a stand-alone software product, a part of an operating system, embedded within firmware of the motherboard, specialized integrated circuits, or a combination thereof.

In the above example, computer system 100 includes a parent partition 204 that can also be thought of as domain 0 in the open source community. Parent partition 204 can be configured to provide resources to guest operating systems executing in child partitions 1-N by using virtualization service providers 228 (VSPs) that are also known as back-end drivers in the open source community. In this example architecture the parent partition 204 can gate access to the underlying hardware. The VSPs 228 can be used to multiplex the interfaces to the hardware resources by way of virtualization service clients (VSCs) that are also known as front-end drivers in the open source community. Each child partition can include one or more virtual processors such as virtual processors 230 through 232 that guest operating systems 220 through 222 can manage and schedule threads to execute thereon. Generally, the virtual processors 230 through 232 are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in these example embodiments, multiple virtual processors can be simultaneously executing while, for example, another logical processor is executing hypervisor instructions. Generally speaking, and as illustrated by the figures, the combination of virtual processors, various VSCs, and memory in a partition can be considered a virtual machine such as virtual machine 240 or 242.

Generally, guest operating systems 220 through 222 can include any operating system such as, for example, operating systems from Microsoft®, Apple®, the open source community, etc. The guest operating systems can include user/kernel modes of operation and can have kernels that can include schedulers, memory managers, etc. A kernel mode can include an execution mode in a logical processor that grants access to at least privileged processor instructions. Each guest operating system 220 through 222 can have associated file systems that can have applications stored thereon such as remote desktop servers, e-commerce servers, email servers, etc., and the guest operating systems themselves. The guest operating systems 220-222 can schedule threads to execute on the virtual processors 230-232 and instances of such applications can be effectuated.

Referring now to FIG. 4, illustrated is an alternative architecture that can be used to effectuate virtual machines. FIG. 4 depicts similar components to those of FIG. 3, however in this example embodiment the hypervisor 202 can include the virtualization service providers 228 and device drivers 224, and parent partition 204 may contain configuration utilities 236. In this architecture, hypervisor 202 can perform the same or similar functions as the hypervisor 202 of FIG. 2. The hypervisor 202 of FIG. 4 can be a stand alone software product, a part of an operating system, embedded within firmware of the motherboard or a portion of hypervisor 202 can be effectuated by specialized integrated circuits. In this example parent partition 204 may have instructions that can be used to configure hypervisor 202 however hardware access requests may be handled by hypervisor 202 instead of being passed to parent partition 204.

Figure 5:
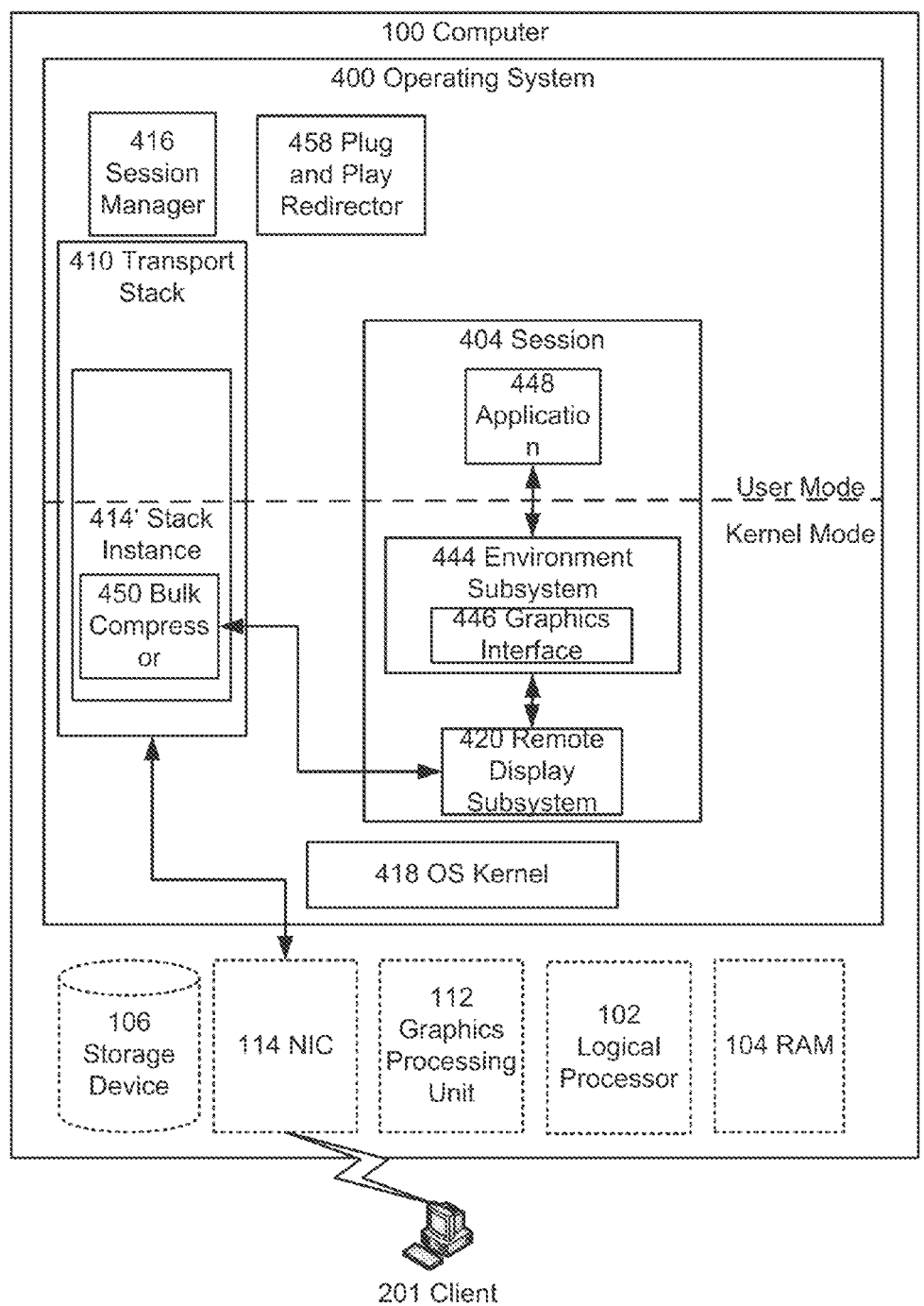
FIG. 5 illustrates a computer system including circuitry for effectuating remote desktop services.

Referring now to FIG. 5, computer 100 may include circuitry configured to provide remote desktop services to connecting clients. In an example embodiment, the depicted operating system 400 may execute directly on the hardware or a guest operating system 220 or 222 may be effectuated by a virtual machine such as VM 216 or VM 218. The underlying hardware 208, 210, 234, 212, and 214 is indicated in the illustrated type of dashed lines to identify that the hardware can be virtualized.

Remote services can be provided to at least one client such as client 401 (while one client is depicted remote services can be provided to more clients.) The example client 401 can include a computer terminal that is effectuated by hardware configured to direct user input to a remote server session and display user interface information generated by the session. In another embodiment, client 401 can be effectuated by a computer that includes similar elements as those of computer 100 FIG. 1b. In this embodiment, client 401 can include circuitry configured to effect operating systems and circuitry configured to emulate the functionality of terminals, e.g., a remote desktop client application that can be executed by one or more logical processors 102. One skilled in the art can appreciate that the circuitry configured to effectuate the operating system can also include circuitry configured to emulate a terminal.

Each connecting client can have a session (such as session 404) which allows the client to access data and applications stored on computer 100. Generally, applications and certain operating system components can be loaded into a region of memory assigned to a session. Thus, in certain instances some OS components can be spawned N times (where N represents the number of current sessions). These various OS components can request services from the operating system kernel 418 which can, for example, manage memory; facilitate disk reads/writes; and configure threads from each session to execute on the logical processor 102. Some example subsystems that can be loaded into session space can include the subsystems that generates desktop environments, the subsystems that track mouse movement within the desktop, the subsystems that translate mouse clicks on icons into commands that effectuate an instance of a program, etc. The processes that effectuate these services, e.g., tracking mouse movement, are tagged with an identifier associated with the session and are loaded into a region of memory that is allocated to the session.

A session can be generated by a session manager 416, e.g., a process. For example, the session manager 416 can initialize and manage each remote session by generating a session identifier for a session space; assigning memory to the session space; and generating system environment variables and instances of subsystem processes in memory assigned to the session space. The session manager 416 can be invoked when a request for a remote desktop session is received by the operating system 400.

A connection request can first be handled by a transport stack 410, e.g., a remote desktop protocol (RDP) stack. The transport stack 410 instructions can configure logical processor 102 to listen for connection messages on a certain port and forward them to the session manager 416. When sessions are generated the transport stack 410 can instantiate a remote desktop protocol stack instance for each session. Stack instance 414 is an example stack instance that can be generated for session 404. Generally, each remote desktop protocol stack instance can be configured to route output to an associated client and route client input to an environment subsystem 444 for the appropriate remote session.

As shown by the figure, in an embodiment an application 448 (while one is shown others can also execute) can execute and generate an array of bits. The array can be processed by a graphics interface 446 which in turn can render bitmaps, e.g., arrays of pixel values, that can be stored in memory. As shown by the figure, a remote display subsystem 420 can be instantiated which can capture rendering calls and send the calls over the network to client 401 via the stack instance 414 for the session.

In addition to remoting graphics and audio, a plug and play redirector 458 can also be instantiated in order to remote diverse devices such as printers, mp3 players, client file systems, CD ROM drives, etc. The plug and play redirector 458 can receive information from a client side component which identifies the peripheral devices coupled to the client 401. The plug and play redirector 458 can then configure the operating system 400 to load redirecting device drivers for the peripheral devices of the client 401. The redirecting device drivers can receive calls from the operating system 400 to access the peripherals and send the calls over the network to the client 401.

As discussed above, clients may use a protocol for providing remote presentation services such as Remote Desktop Protocol (RDP) to connect to a resource using terminal services. When a remote desktop client connects to a remote desktop server via a remote desktop server gateway, the gateway may open a socket connection with the remote desktop server and redirect client traffic on the remote presentation port or a port dedicated to remote access services. The gateway may also perform certain gateway specific exchanges with the client using a remote desktop server gateway protocol transmitted over HTTPS.

Figure 6:
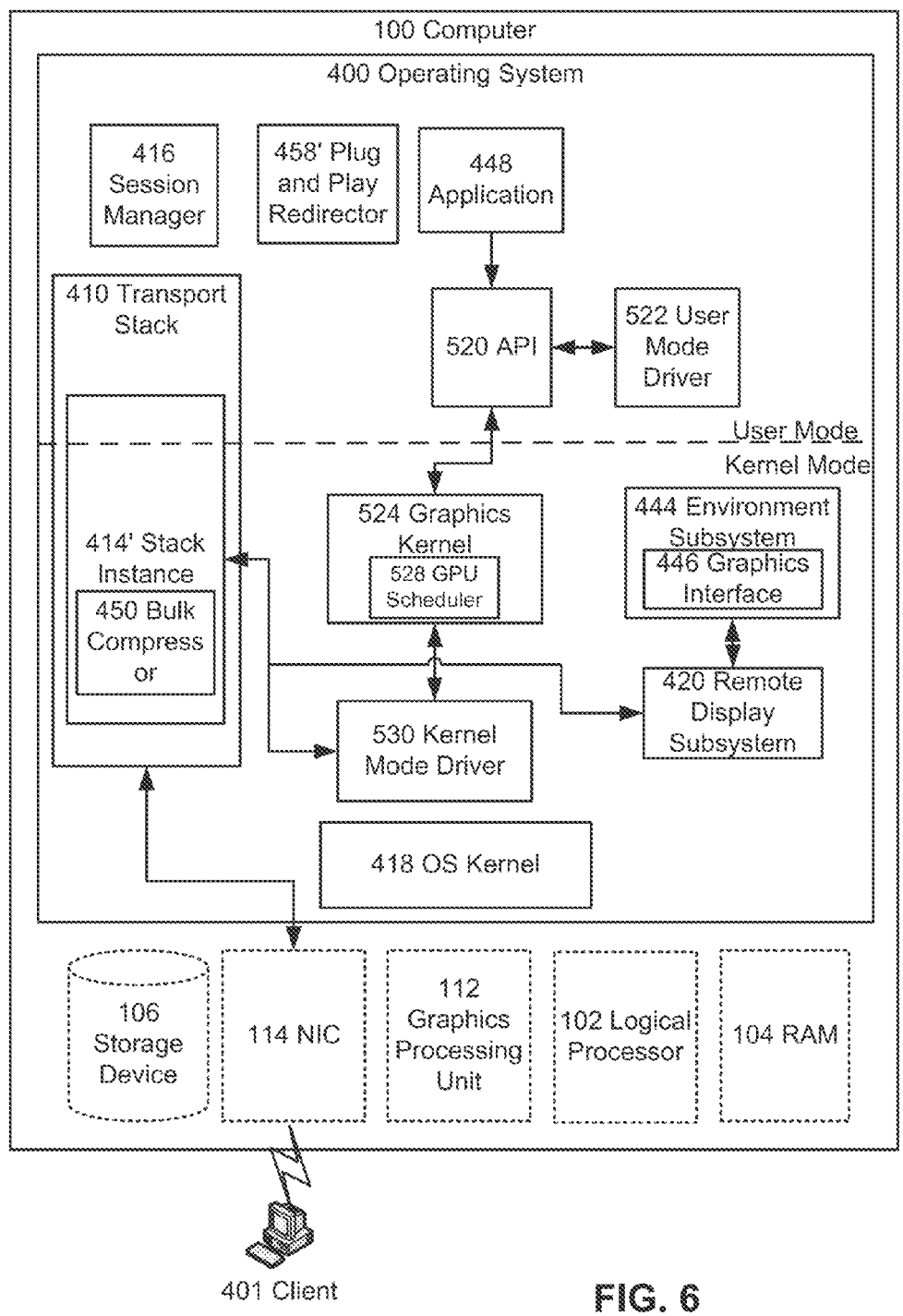
FIG. 6 illustrates a computer system including circuitry for effectuating remote services.

Turning to FIG. 6, depicted is a computer system 100 including circuitry for effectuating remote services and for incorporating aspects of the present disclosure. As shown by the figure, in an embodiment a computer system 100 can include components similar to those described in FIG. 2 and FIG. 5, and can effectuate a remote presentation session. In an embodiment of the present disclosure a remote presentation session can include aspects of a console session, e.g., a session spawned for a user using the computer system, and a remote session. Similar to that described above, the session manager 416 can initialize and manage the remote presentation session by enabling/disabling components in order to effectuate a remote presentation session.

One set of components that can be loaded in a remote presentation session are the console components that enable high fidelity remoting, namely, the components that take advantage of 3D graphics and 2D graphics rendered by 3D hardware.

3D/2D graphics rendered by 3D hardware can be accessed using a driver model that includes a user mode driver 522, an API 520, a graphics kernel 524, and a kernel mode driver 530. An application 448 (or any other process such as a user interface that generates 3D graphics) can generate API constructs and send them to an application programming interface 520 (API) such as Direct3D from Microsoft®. The API 520 in turn can communicate with a user mode driver 522 which can generates primitives, e.g., the fundamental geometric shapes used in computer graphics represented as vertices and constants which are used as building blocks for other shapes, and stores them in buffers, e.g., pages of memory. In one embodiment the application 448 can declare how it is going to use the buffer, e.g., what type of data it is going to store in the buffer. An application, such as a videogame, may use a dynamic buffer to store primitives for an avatar and a static buffer for storing data that will not change often such as data that represents a building or a forest.

Continuing with the description of the driver model, the application can fill the buffers with primitives and issue execute commands. When the application issues an execute command the buffer can be appended to a run list by the kernel mode driver 530 and scheduled by the graphics kernel scheduler 528. Each graphics source, e.g., application or user interface, can have a context and its own run list. The graphics kernel 524 can be configured to schedule various contexts to execute on the graphics processing unit 112. The GPU scheduler 528 can be executed by logical processor 102 and the scheduler 528 can issue a command to the kernel mode driver 530 to render the contents of the buffer. The stack instance 414 can be configured to receive the command and send the contents of the buffer over the network to the client 401 where the buffer can be processed by the GPU of the client.

Illustrated now is an example of the operation of a virtualized GPU as used in conjunction with an application that calls for remote presentation services. Referring to FIG. 6, in an embodiment a virtual machine session can be generated by a computer 100. For example, a session manager 416 can be executed by a logical processor 102 and a remote session that includes certain remote components can be initialized. In this example the spawned session can include a kernel 418, a graphics kernel 524, a user mode display driver 522, and a kernel mode display driver 530. The user mode driver 522 can generate graphics primitives that can be stored in memory. For example, the API 520 can include interfaces that can be exposed to processes such as a user interface for the operating system 400 or an application 448. The process can send high level API commands such as such as Point Lists, Line Lists, Line Strips, Triangle Lists, Triangle Strips, or Triangle Fans, to the API 420. The API 520 can receive these commands and translate them into commands for the user mode driver 522 which can then generate vertices and store them in one or more buffers. The GPU scheduler 528 can run and determine to render the contents of the buffer. In this example the command to the graphics processing unit 112 of the server can be captured and the content of the buffer (primitives) can be sent to client 401 via network interface card 114. In an embodiment, an API can be exposed by the session manager 416 that components can interface with in order to determine whether a virtual GPU is available.

In an embodiment a virtual machine such as virtual machine 240 of FIG. 3 or 4 can be instantiated and the virtual machine can serve as a platform for execution for the operating system 400. Guest operating system 220 can embody operating system 400 in this example. A virtual machine may be instantiated when a connection request is received over the network. For example, the parent partition 204 may include an instance of the transport stack 410 and may be configured to receive connection requests. The parent partition 204 may initialize a virtual machine in response to a connection request along with a guest operating system including the capabilities to effectuate remote sessions. The connection request can then be passed to the transport stack 410 of the guest operating system 220. In this example each remote session may be instantiated on an operating system that is executed by its own virtual machine.

In one embodiment a virtual machine can be instantiated and a guest operating system 220 embodying operating system 400 can be executed. Similar to that described above, a virtual machine may be instantiated when a connection request is received over the network. Remote sessions may be generated by an operating system. The session manager 416 can be configured to determine that the request is for a session that supports 3D graphics rendering and the session manager 416 can load a console session. In addition to loading the console session the session manager 416 can load a stack instance 414' for the session and configure system to capture primitives generated by a user mode display driver 522.

The user mode driver 522 may generate graphics primitives that can be captured and stored in buffers accessible to the transport stack 410. A kernel mode driver 530 can append the buffers to a run list for the application and a GPU scheduler 528 can run and determine when to issue render commands for the buffers. When the scheduler 528 issues a render command the command can be captured by, for example, the kernel mode driver 530 and sent to the client 401 via the stack instance 414'.

The GPU scheduler 528 may execute and determine to issue an instruction to render the content of the buffer. In this example the graphics primitives associated with the instruction to render can be sent to client 401 via network interface card 114.

In an embodiment, at least one kernel mode process can be executed by at least one logical processor 112 and the at least one logical processor 112 can synchronize rendering vertices stored in different buffers. For example, a graphics processing scheduler 528, which can operate similarly to an operating system scheduler, can schedule GPU operations. The GPU scheduler 528 can merge separate buffers of vertices into the correct execution order such that the graphics processing unit of the client 401 executes the commands in an order that allows them to be rendered correctly.

One or more threads of a process such as a videogame may map multiple buffers and each thread may issue a draw command. Identification information for the vertices, e.g., information generated per buffer, per vertex, or per batch of vertices in a buffer, can be sent to the GPU scheduler 528. The information may be stored in a table along with identification information associated with vertices from the same, or other processes and used to synchronize rendering of the various buffers.

An application such as a word processing program may execute and declare, for example, two buffers—one for storing vertices for generating 3D menus and the other one storing commands for generating letters that will populate the menus. The application may map the buffer and; issue draw commands. The GPU scheduler 528 may determine the order for executing the two buffers such that the menus are rendered along with the letters in a way that it would be pleasing to look at. For example, other processes may issue draw commands at the same or a substantially similar time and if the vertices were not synchronized vertices from different threads of different processes could be rendered asynchronously on the client 401 thereby making the final image displayed seem chaotic or jumbled.

A bulk compressor 450 can be used to compress the graphics primitives prior to sending the stream of data to the client 401. In an embodiment the bulk compressor 450 can be a user mode (not shown) or kernel mode component of the stack instance 414 and can be configured to look for similar patterns within the stream of data that is being sent to the client 401. In this embodiment, since the bulk compressor 450 receives a stream of vertices, instead of receiving multiple API constructs, from multiple applications, the bulk compressor 450 has a larger data set of vertices to sift through in order to find opportunities to compress. That is, since the vertices for a plurality of processes are being remoted, instead of diverse API calls, there is a larger chance that the bulk compressor 450 will be able to find similar patterns in a given stream.

In an embodiment, the graphics processing unit 112 may be configured to use virtual addressing instead of physical addresses for memory. Thus, the pages of memory used as buffers can be paged to system RAM or to disk from video memory. The stack instance 414' can be configured to obtain the virtual addresses of the buffers and send the contents from the virtual addresses when a render command from the graphics kernel 528 is captured.

An operating system 400 may be configured, e.g., various subsystems and drivers can be loaded to capture primitives and send them to a remote computer such as client 401. Similar to that described above, a session manager 416 can be executed by a logical processor 102 and a session that includes certain remote components can be initialized. In this example the spawned session can include a kernel 418, a graphics kernel 524, a user mode display driver 522, and a kernel mode display driver 530.

A graphics kernel may schedule GPU operations. The GPU scheduler 528 can merge separate buffers of vertices into the correct execution order such that the graphics processing unit of the client 401 executes the commands in an order that allows them to be rendered correctly.

All of these variations for implementing the above mentioned partitions are just exemplary implementations, and nothing herein should be interpreted as limiting the disclosure to any particular virtualization aspect.

Remote Content Classification And Transmission Using Multiple Transport Channels The process of compressing, encoding and decoding graphics data as referred to herein may generally use one or more methods and systems described in commonly assigned U.S. Pat. No. 7,460,725 entitled "System And Method For Effectively Encoding And Decoding Electronic Information," hereby incorporated by reference in its entirety.

In various methods and systems disclosed herein, improvements to the transmission of remote presentation graphics data to a client computer may be implemented to provide a more timely and rich user experience. The embodiments disclosed herein for encoding and transmitting graphics data may be implemented using various combinations of hardware and software processes. In some embodiments, functions may be executed entirely in hardware. In other embodiments, functions may be performed entirely in software. In yet further embodiments, functions may be implemented using a combination of hardware and software processes. Such processes may further be implemented using one or more CPUs and/or one or more specialized processors such as a graphics processing unit (GPU) or other dedicated graphics rendering devices.

In remote desktop scenarios the graphics content of a user's desktop located on a host computer (e.g., the server) is typically streamed to another computer (e.g., the client). The server and the client will exchange the desktop graphics data in a well defined protocol or format. Microsoft's™ Remote Desktop Protocol (RDP) is an example of such a protocol. The RDP protocol is a stream oriented protocol that may use a stream based transport such as the Transmission Control Protocol (TCP) for exchanging data with the client. Protocols such as the TCP protocol typically exhibit inconsistent throughput especially when the underlying transport is a wide area network (WAN) connection. If such a link is used for RDP traffic, such unpredictable throughput may result in a negative user experience because the desktop graphics data may be delivered to the client in a time delayed fashion.

Accordingly, when providing a remote presentation session with a client computer using a protocol such as RDP, in some scenarios it may be desirable to execute the protocol over a lossy transport. For example, when a particular link is experiencing a high loss rate, the use of some stream-based protocols such as TCP may result in a significant delay. In such protocols, when data packets are not properly received or lost, the lost data packets must be retransmitted before progress can be made in the processing of the received data. Thus in such cases it may be advantageous to use a lossy datagram transport mechanism rather than a streaming lossless transport mechanism. Lossy protocols can be any type of protocol that may generally be characterized as protocol with lossy semantics. Such protocols may not provide verification of delivery, retransmission of lost data, and implied or explicit ordering of data packets. Such protocols may also be referred to as a datagram protocol. By being able to transmit data on a lossy datagram protocol, much of the delay caused by recovery mechanisms for lost packets may be avoided. In various embodiments disclosed herein, methods are described that address the above issues by providing a loss tolerant graphics exchange protocol and thus allowing the use of a non-stream based protocol such as User Datagram Protocol (UDP).

Figure 7:
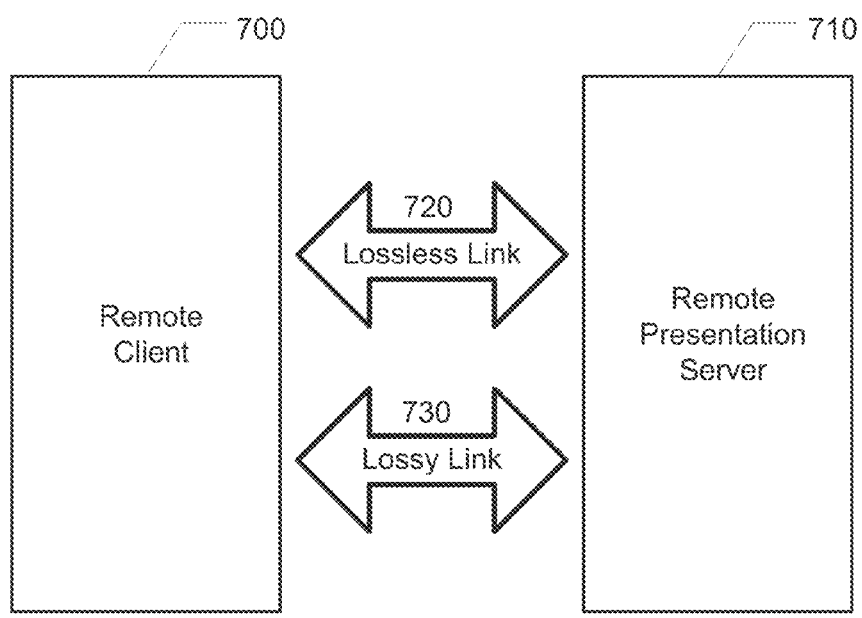
FIG. 7 illustrates an example architecture incorporating aspects of the methods disclosed herein.

In one embodiment, a secondary UDP connection may be provided for transmitting the graphics data. FIG. 7 depicts a connection between a remote desktop server 710 and a remote client 700. In typical remote presentation configurations, the client and the server exchange information through the lossless link 720. Such information may comprise both control and graphics data. In an embodiment, a lossy link 730 is added to the connection between the client and the server. The lossy link 730 may be used to exchange the graphics data. The lossless link 720 may be used for control type data, such as a list of encryption keys or bitmap cache confirmation.

In one embodiment, a first connection may be established with the client computer, the first connection being established using a lossless protocol characterized by guaranteed packet delivery and packet order. Connection capabilities may then be established with the client computer to determine whether the client computer and/or the graphics source can support a second connection. The second connection may use a lossy protocol characterized by non-guaranteed packet delivery and packet ordering. If both endpoints can support the second connection, then the second connection can be established. Once established, the first connection can be used to manage graphics data transmission to the client computer and the second connection can be used to transmit the remote presentation graphics data to the client computer. Thus in some embodiments a first connection using a lossless protocol such as TCP can be established, and optionally the endpoints can negotiate to establish a second lossy link using, for example, UDP to more efficiently transmit graphics data. Additionally and optionally, the second connection can be terminated and the first connection used to transmit the remote presentation graphics data as a fallback transmission method. For example, if the network changes such that use of the second connection cannot be tolerated or if a connectivity issue arises because, for example, the lossy link cannot traverse a firewall, then the remote presentation session can degrade to use only the first connection as a fallback. In some embodiments this fallback mechanism can occur automatically.

It is advantageous to maintain a control channel over a lossless link while transmitting data over the lossy channel in order to exchange information regarding the status of the lossy link. For example, using the control channel the endpoints can exchange information as to whether the connection has been closed and otherwise manage the connection such as managing the lifetime of the connection. In some embodiments the client can send feedback to the server as to whether any expected data was not received. In one embodiment, the server or graphics source may receive from the client computer, using the first connection, feedback describing remote presentation graphics data that was not received. In response to the feedback, the server or graphics source may transmit, over the second (lossy) connection, the remote presentation graphics data that was not received. Thus in some embodiments, in the event of a data loss issue, rather than re-transmitting large portions of the data, the server or graphics source may only send any unreceived packets indicated by the client. In some embodiments, the server or graphics source may wait for a predetermined period of time for acknowledgements of data received. If there is no acknowledgment then the server or graphics source may assume that an unacknowledged data packet was lost and needs to be retransmitted.

In various embodiments, the types of data to be transmitted can be divided into two categories. One category can include data that should not use a lossy link such as, for example, a security handshake or capability negotiation. A second category can include data that can us a lossy link such as video data. The first category can also include data for management of the lossy data, such as data that indicates that a certain piece of the client screen was not received.

The first category may use a primary link that can generally be characterized as a lossless link that guarantees data delivery and provides indication of the order of the data packets. Lossless protocols can be any type of protocol that may generally be characterized as a protocol with lossless semantics. Such protocols may provide one or more of the following functions: verification of delivery, retransmission of lost data, and implied or explicit ordering of data packets. Higher level protocols for remote desktop presentation include Remote Desktop Protocol (RDP) which is used herein for illustrative purposes. However, the concepts and methods disclosed may be used in conjunction with other remote presentation protocols.

Figure 8:
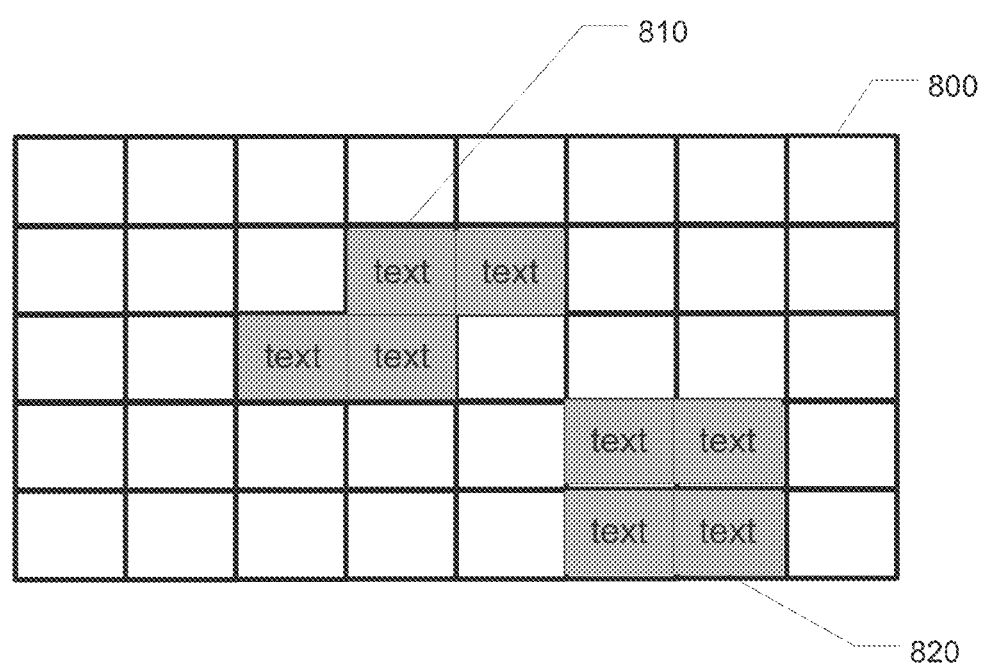
FIG. 8 illustrates an example of dividing a captured frame.

FIG. 8 depicts an example user screen 800 of a user's desktop divided into rectangular tiles. The desktop may be "tiled" in equally sized bitmaps, which may then be represented as a frame. In this example, the darkened tiles 810 and 820 represent tiles that have changed and are to be sent to the client. Thus in this case the frame that is sent to the client will contain two types of graphics elements. The tiles that are not changed may be represented as empty rectangles. The tiles that have changed may actually be sent as encoded bitmaps.

The methods disclosed herein are not limited to a particular type of graphics data such as bitmaps. The disclosed methods can apply to any type of graphic object. For example, the graphics data may comprise a description of entities to be drawn. Generally the lossless channel can be used to notify the client of the type and nature of the data that will be transmitted and the expected result after rendering. The actual graphics data can then be transmitted to the client on the lossy channel, and the client can compare what was actually received and the result of the rendering actions to determine if any data was missing or if there is a discrepancy between what was expected in the received data or as a result of performing the expected actions on the data. In one embodiment the client can note any transactions not received or screen areas that have not been updated and notify the server of the discrepancy. In other embodiments, the client make some intelligent decisions such as determining that only a small portion of the screen is missing and determining to wait longer for the missing data or determine that the data is not needed.

The above described techniques may be applied to multiple monitor scenarios. A component on the server may, for example, determine the number of video presentation paths from the video presentation network information as maintained by the server. Each video presentation source may be provided with a set of video data as described above.

Figure 9:
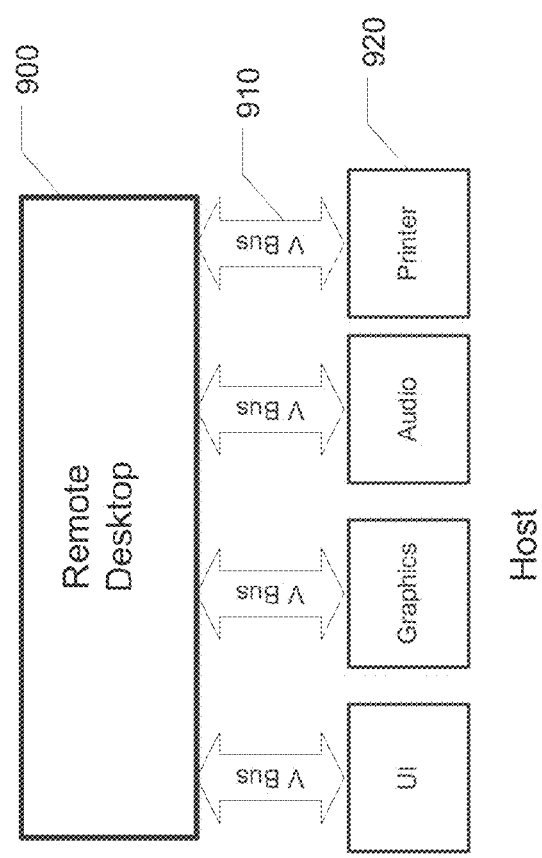
FIG. 9 illustrates an example architecture incorporating aspects of the methods disclosed herein.

As mentioned previously, in a remote/virtual desktop environment, graphics data is typically rendered on the host partition and transferred to the client using remote presentation protocols such as RDP after some form of compression is applied to the data. Graphics data typically consists of various elements that may have different tolerances to data loss and transmission delays. In addition, the overall remote desktop experience may include other elements with differences in their requirements for delivery reliability and transmission delays. FIG. 9 illustrates some examples of such display and experience elements. A remote desktop 900 at a client computer may be established with a host such as a remote desktop server over a communications session 910. A plurality of display and experience elements 920 may include:

- Remote protocol control data, which needs reliable and in-sequence delivery. Remote protocol control data needs to be delivered quickly, but the data may not have the real-time constraints.
- User input data (e.g., keyboard/mouse), which needs reliable and in-sequence delivery. User input data also needs to be delivered quickly to maintain responsiveness.
- Video Playback, which needs fast delivery and a consistent throughput, but can tolerate loss and out-of-sequence delivery
- Audio data, which needs fast/real-time delivery, but can tolerate loss and out-of-sequence delivery
- Printer data which needs reliable and in-sequence delivery. However, Printer data may tolerate higher delays during delivery.

During a remote presentation session, a single transport channel is typically used for sending all of the data elements. This single channel, in-turn, is typically optimized for only one class or type of data delivery. As a result some of the delivery constraints for a particular data element may not be met if the data element is not of the class or type for which the channel is optimized, thus resulting in negative user experience. For example, if all data elements are forced to use a TCP based transport channel which guarantees reliable and in-sequence delivery, audio data from a voice over IP (VoIP) call may not be delivered in real-time, resulting in conversation delays for remote users.

Figure 10:
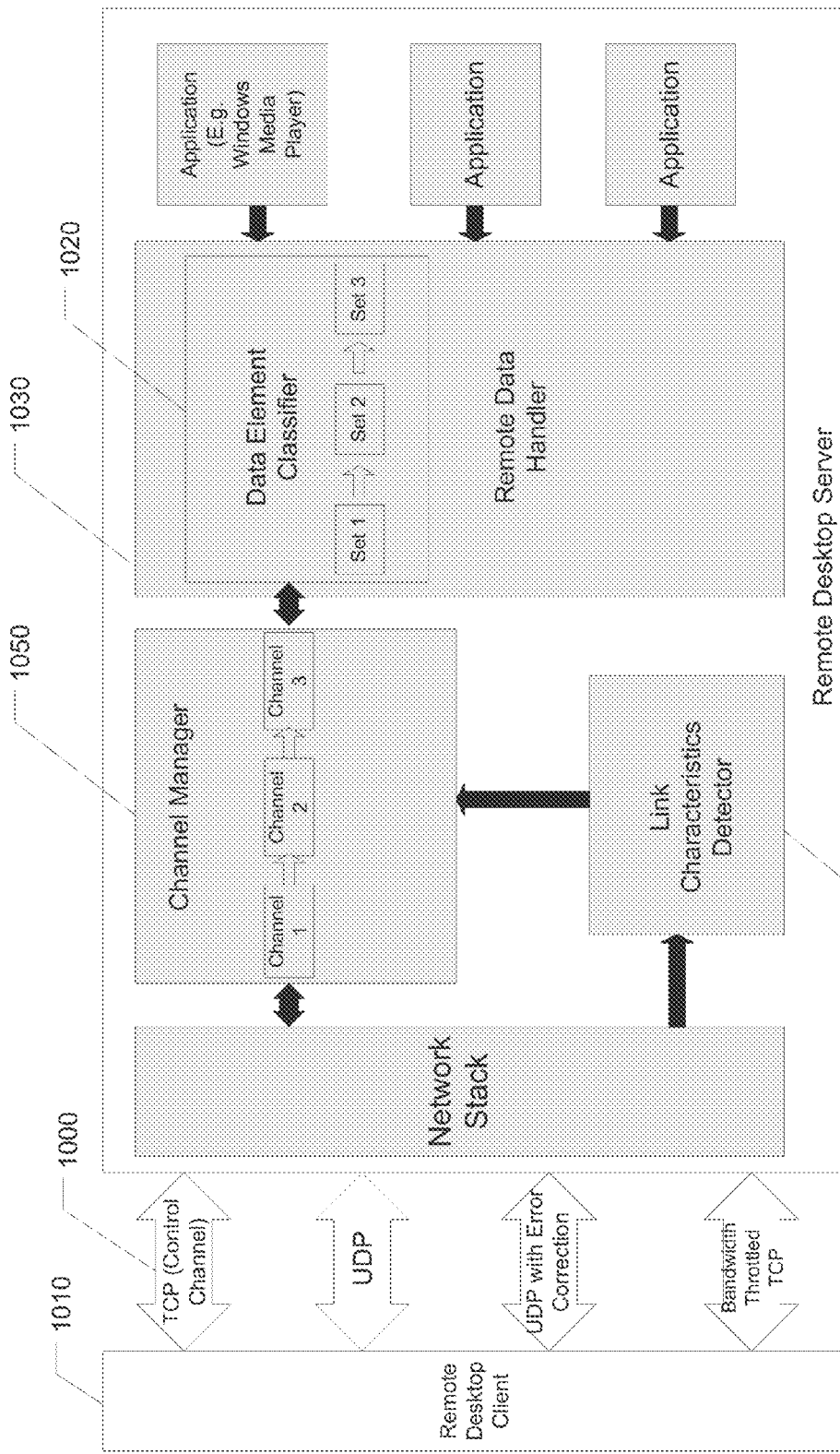
FIG. 10 illustrates an example architecture incorporating aspects of the methods disclosed herein.

In various embodiments, methods and systems are disclosed for the implementation of additional transport channels between the client and server depending on the data element being transmitted. For example, referring to FIG. 10, transport channels 1000 may be established with remote desktop client 1010. Each of the additional channels 1000 may be adapted to efficiently communicate data for a particular data type and thus be particularly well suited for its data-element characteristics (e.g., bit-rate of video being transmitted) and the detected link characteristics between the client and server (e.g. bandwidth, latency, loss, and presence of intermediate proxies).

In one embodiment, the remote display and experience data may be separated into sets of elements with similar transport delivery requirements and independent transport channels may be used for their delivery. In some embodiments, data-element characteristics and measured transport characteristics may be used to select the type of channel (e.g., TCP vs. UDP) and to further optimize the channel to meet delivery requirements (e.g., adding some form of error-correction to UDP).

In another embodiment, resources (such as available bandwidth) may be allocated among the multiple channels based on requirements for each of the channels. Furthermore, each channel's characteristics may be continuously adjusted based on changing network conditions and data-element requirements. In some embodiments, a capability to determine reliable link characteristics in the presence of multiple channels between client and server may be provided.

Thus in various embodiments a system is disclosed that identifies the data-elements, determines their transmission characteristics, creates new data-channels for the data-elements as needed, and optimizes the created channels. Referring again to FIG. 10, in an example implementation a data element classifier 1020 may be a part of a remote data handler component 1030 that handles the display and other experience data for transmission between the server and client. The data element classifier 1020 may examine remote data from applications 1040 and divide the remote data into sets according to the data's characteristics and transport requirements. An example of such classification is shown in the following table.

| Sets | Data Type | Data Characteristics | Transport Characteristics |
|---|---|---|---|
| Set 1 | Video Stream | Constant Bit rate 1 MBps, loss-tolerant encoded | Loss tolerant, rate sensitive |
| Set 2 | Display | Required frame rate of 20 FPS | Needs reliable delivery, rate sensitive |
| Set 3 | Audio Stream | Constant bit-rate of 128 kbps | Loss tolerant, rate and time sensitive |
| Set 4 | Printer Data | Expected size | Needs reliable delivery, not time sensitive |

In one embodiment, a channel manager 1050 may be provided that uses inputs from the data element classifier and a link characteristics detector 1060 to determine the channels to be used between the client and server. Some channels may be opened at the time that the connection is established (e.g., the channel used for the control data) and some channels may be opened "on-demand" as new data-element sets become available (e.g., a new video stream starts playing). The channel manager may also receive information describing the available link bandwidth and perform bandwidth allocation among the channels such that the needs of the data-sets may be satisfied. Furthermore, the channel manager may dynamically adjust the channel characteristics based on changing needs of the data-sets and the link characteristics. For example, if a data set has completed transmission, the bandwidth allocated to the data set may be allocated to other active channels.

The table below illustrates one example of channel allocation provided by the channel manager for the data-element sets mentioned above.

| Data Set | Channel Type | Error Correction | Bandwidth Allocation |
|---|---|---|---|
| Set 1 | UDP | None | 1 Mbps |
| Set 2 | UDP | Yes | Minimum 1.5 Mbps |
| Set 3 | UDP with QoS options | None | 129 Kbps |
| Set 4 | TCP | Not needed | Max 200 Kbps |

The channel manager may also provide appropriate feedback to user applications if the applications are configured to receive the feedback. The applications may then adjust their data-generation rate based on available channels and their characteristics.

In an embodiment, the link characteristics detector 1060 may continuously monitor the link between the client and server for characteristics such as available bandwidth, end-to-end latency, and data loss. The link characteristics detector 1060 may also ensure that the measurements are performed such that they take into account the data flowing through all the channels between the client and server. This data may then be provided to the channel manager to optimize the channels currently in use or subsequently opened.

A link characteristics detector may incorporate some of the functionality described in common assigned U.S. patent application Ser. No. 12/719,669, filed on Mar. 8, 2010), hereby incorporated in its entirety.

Figure 11:
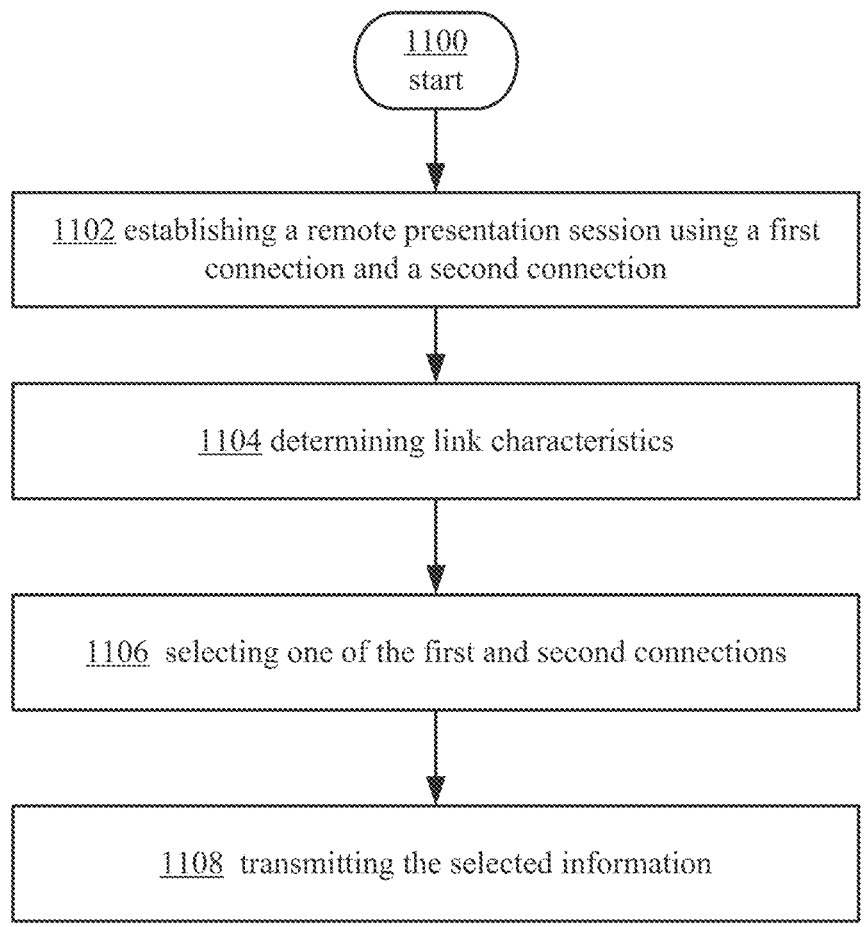
FIG. 11 illustrates an example of an operational procedure for processing graphics data for transmission to a client computer.

FIG. 11 depicts an exemplary operational procedure for transmitting remote presentation data from a computing device to a client computing device including operations 1100, 1102, 1104, 1106, and 1108. Referring to FIG. 11, operation 1100 begins the operational procedure and operation 1102 illustrates establishing a remote presentation session using a first connection and a second connection with the client computing device, wherein the first and second connections are established using different data delivery characteristics. Operation 1104 illustrates determining link characteristics of the first and second connections. Operation 1106 illustrates selecting one of the first and second connections based on content of selected information to be sent to the client computing device and said link characteristics. Operation 1108 illustrates transmitting the selected information to the client computing device using the selected connection.

Figure 12:
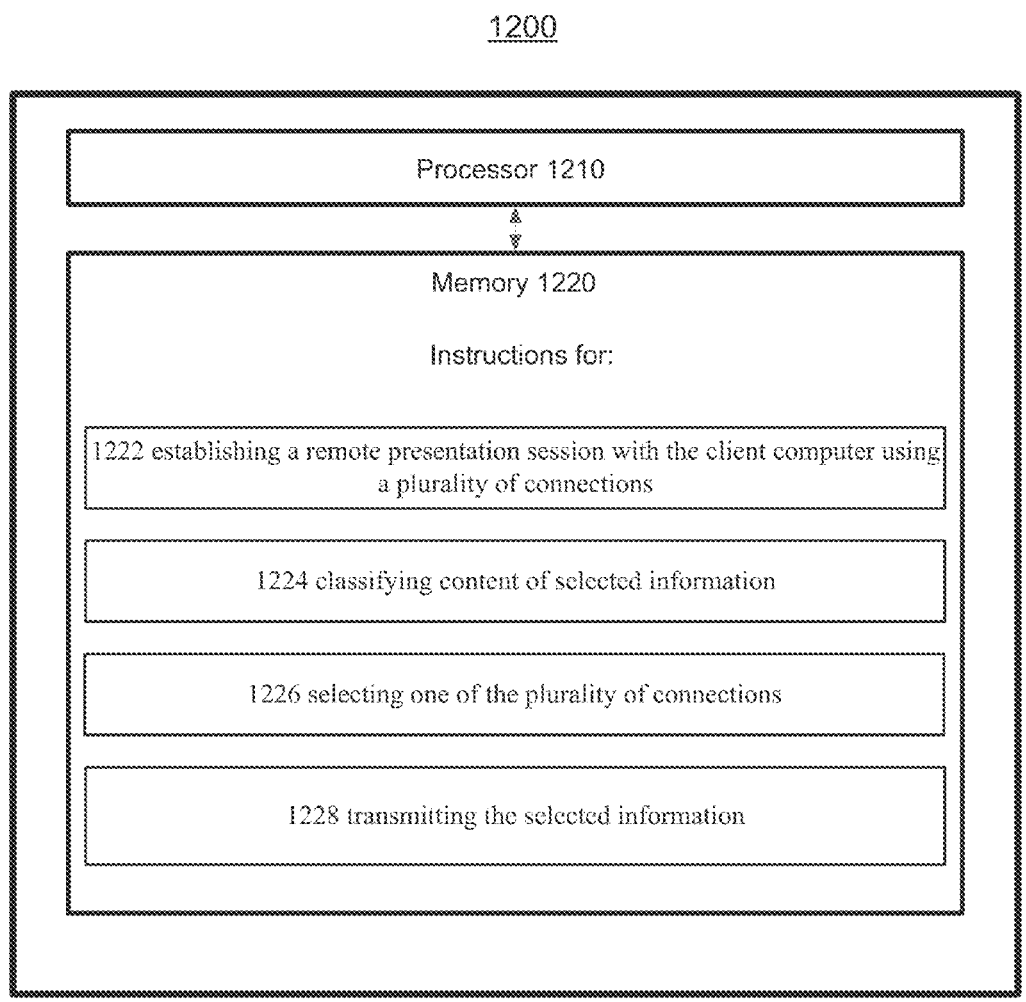
FIG. 12 illustrates an example system for incorporating aspects of the present disclosure.

FIG. 12 depicts an exemplary system for transmitting remote presentation data to a client computer as described above. Referring to FIG. 12, system 1200 comprises a processor 1210 and memory 1220. Memory 1220 further comprises computer instructions configured to transmit remote presentation data to a client computer. Block 1222 illustrates establishing a remote presentation session with the client computer using a plurality of connections, wherein the plurality of connections are established each using different data delivery characteristics. Block 1224 illustrates classifying content of selected information to be sent to the client computer based on data delivery characteristics of the content. Block 1226 illustrates selecting one of the plurality of connections based on said classifying and link characteristics of the plurality of connections. Block 1228 illustrates transmitting the selected information to the client computer using the selected connection.

Any of the above mentioned aspects can be implemented in methods, systems, computer readable media, or any type of manufacture. For example, per FIG. 13, a computer readable medium can store thereon computer executable instructions for receiving remote presentation data on a client computer. Such media can comprise a first subset of instructions for establishing a remote presentation session with a remote presentation graphics source using plurality of connections, wherein the plurality of connections are established each using different data delivery characteristics 1310; a second subset of instructions for receiving a selection of one of the plurality of connections, wherein the selection is based on content of selected information to be received at the client computing device and link characteristics of the plurality of connections 1312; and a third subset of instructions for receiving the selected information using the selected connection 1314. It will be appreciated by those skilled in the art that additional sets of instructions can be used to capture the various other aspects disclosed herein, and that the three presently disclosed subsets of instructions can vary in detail per the present disclosure.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the invention has been particularly shown and described with reference to a preferred embodiment thereof, it will be understood by those skilled in the art that various changes in form and detail may be made without departing from the scope of the present invention as set forth in the following claims. Furthermore, although elements of the invention may be described or claimed in the singular, the plural is contemplated unless limitation to the singular is explicitly stated.

What is claimed:

1. A method for transmitting remote presentation data from a computing device to a client computing device, the method comprising:
   establishing a remote presentation session using a first connection and a second connection with the client computing device, wherein the first connection is configured to use UDP using first data delivery characteristics including error correction and the second connection is configured to use UDP using second data delivery characteristics different from the first data delivery characteristics, the second data delivery characteristics not including error correction;
   determining link characteristics of the first and second connections and classifying content of selected information to be sent to the client computing device, the content including control data and graphics data;
   selecting one of the first and second connections based on said classifying and said link characteristics; and
   transmitting the selected information to the client computing device using the selected connection;
   wherein the first connection is selected for transmission of control data, and the second connection is selected for transmission of graphics data.

2. The method of claim 1, further comprising terminating the second connection and using the first connection to transmit the remote presentation data as a fallback transmission method.

3. The method of claim 1, further comprising establishing additional connections with the computing device, wherein each of the additional connections are established using different data delivery characteristics.

4. The method of claim 3, wherein at least one connection is established on an on-demand basis.

5. The method of claim 1, further comprising monitoring the first and second connections and adjusting said selecting based on link characteristics of the connections.

6. The method of claim 1, further comprising adapting each of the first and second connections according to at least one data type.

7. The method of claim 1, wherein said content comprises at least one of audio, video, printer, remote protocol control data, and user input data.

8. The method of claim 1, wherein the link characteristics comprise bit rate.

9. The method of claim 1, wherein the link characteristics comprise bandwidth, latency, loss and presence of intermediate proxies.

10. The method of claim 1, further comprising separating remote presentation data into sets of data with similar transport delivery requirements.

11. A system configured to transmit remote presentation data to a client computer, comprising:
    at least one processor; and
    at least one memory communicatively coupled to said at least one processor when the system is operational, the memory having stored therein computer-executable instructions that, upon execution by the processor, cause:
    establishing a remote presentation session with the client computer using a plurality of connections, wherein the plurality of connections are established each provide different data delivery characteristics and wherein a first one of the connections is configured to use UDP using first data delivery characteristics including error correction and a second one of the connections is configured to use UDP using second data delivery characteristics different from the first data delivery characteristics, the second data delivery characteristics not including error correction;

classifying content of selected information to be sent to the client computer based on data delivery characteristics of the content, the content including control data and graphics data;

selecting one of the first and second connections based on said classifying and link characteristics of the plurality of connections; and transmitting the selected information to the client computer using the selected connection;

wherein the first connection is selected for transmission of control data, and the second connection is selected for transmission of graphics data.

12. The system of claim 11, further comprising monitoring the connections and switching connections based on link characteristics of the connections.

13. The system of claim 11, further comprising adapting each of the connections according to at least one data type.

14. The system of claim 11, wherein at least one connection is established on an on-demand basis.

15. A computer readable storage device storing thereon computer executable instructions for receiving remote presentation data on a client computer, said instructions for:

establishing a remote presentation session with a remote presentation graphics source using a plurality of connections, wherein the plurality of connections are established each using different data delivery characteristics and wherein a first one of the connections is configured to use UDP using first data delivery characteristics including error correction and a second one of the connections is configured to use UDP using second data delivery characteristics different from the first data delivery characteristics, the second data delivery characteristics not including error correction;

receiving a selection of one of the plurality of connections, wherein the selection is based on content of selected information to be received at the client computer and link characteristics of the plurality of connections; and receiving the selected information using the selected connection;

wherein control data is received via the first one of the connections and graphics data is received via the second one of the connections.

16. The computer readable storage device of claim 15, wherein one of the plurality of connections uses TCP.

17. The computer readable storage device of claim 15, wherein an additional connection uses UDP with reliable delivery semantics using forward error correction and datagram retransmissions.

18. The computer readable storage device of claim 15, wherein the link characteristics comprise at least one of bandwidth, latency, loss and presence of intermediate proxies.

19. The computer readable storage device of claim 15, further receiving another selection of one of the plurality of connections based on link characteristics of the plurality of connections.

* * * * *